July 10, 1934.      L. P. CROSMAN      1,965,884
PROVING CALCULATING MACHINE
Filed April 13, 1933      15 Sheets-Sheet 1
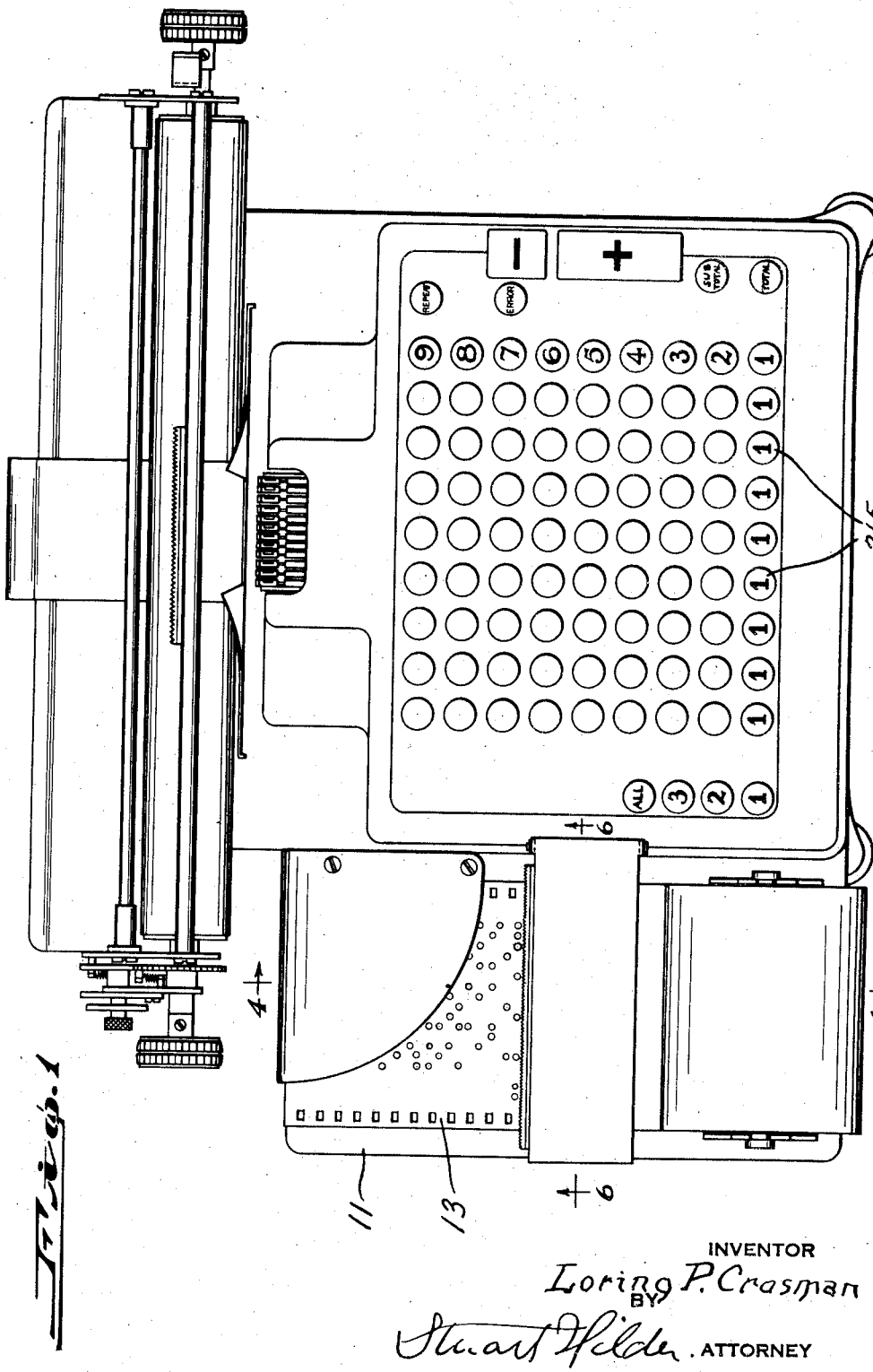
INVENTOR
Loring P. Crosman
BY
Stuart Wilder, ATTORNEY

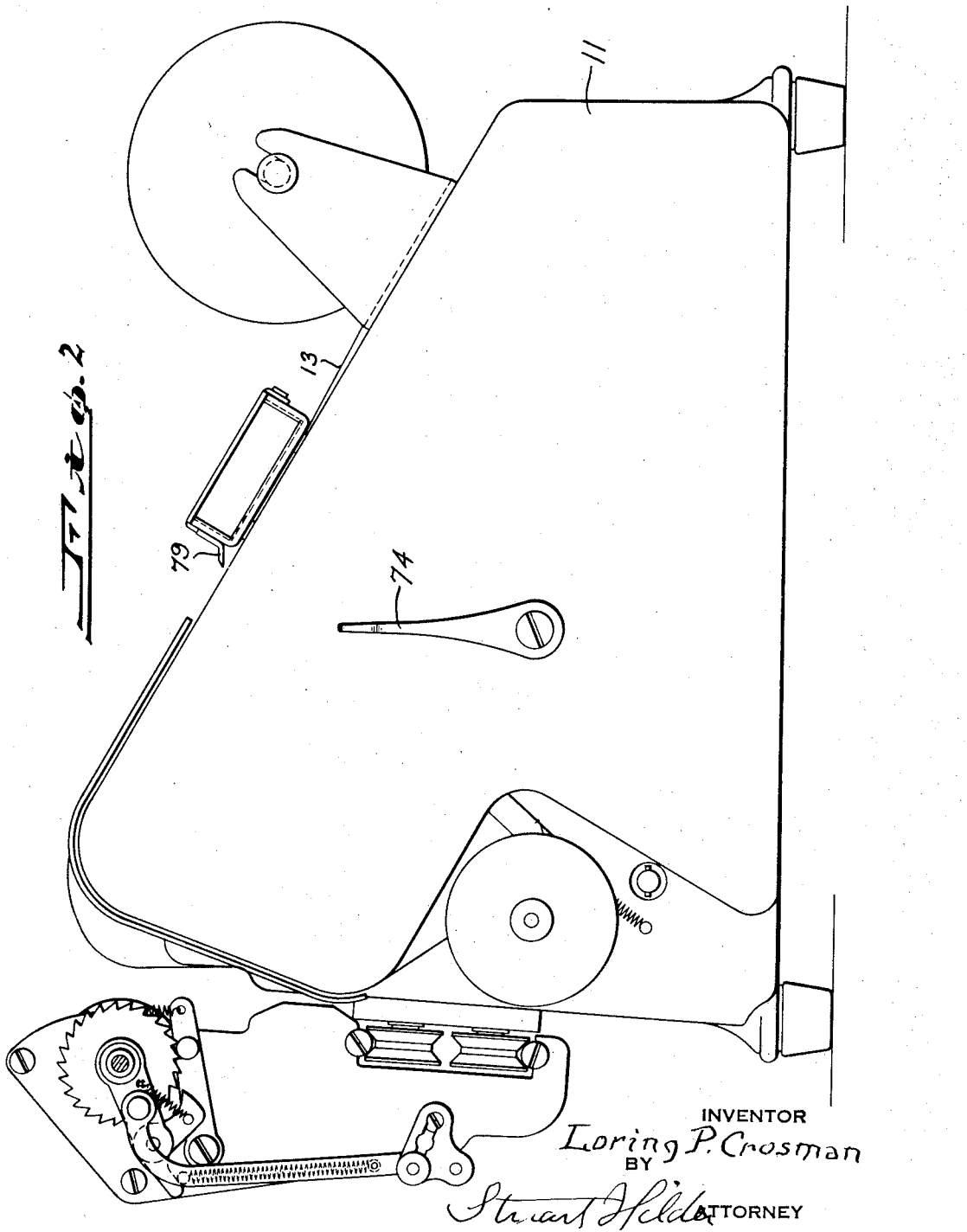

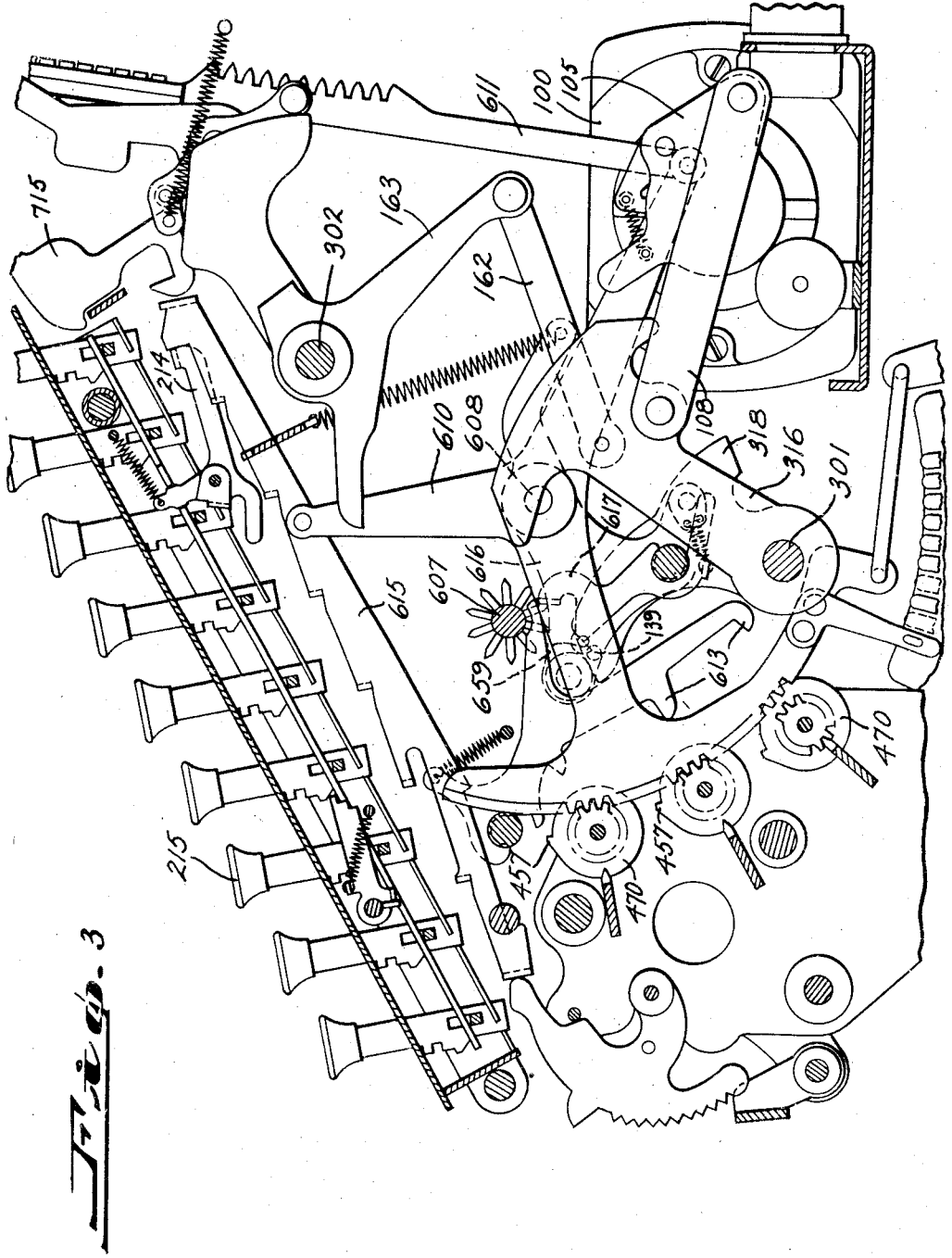

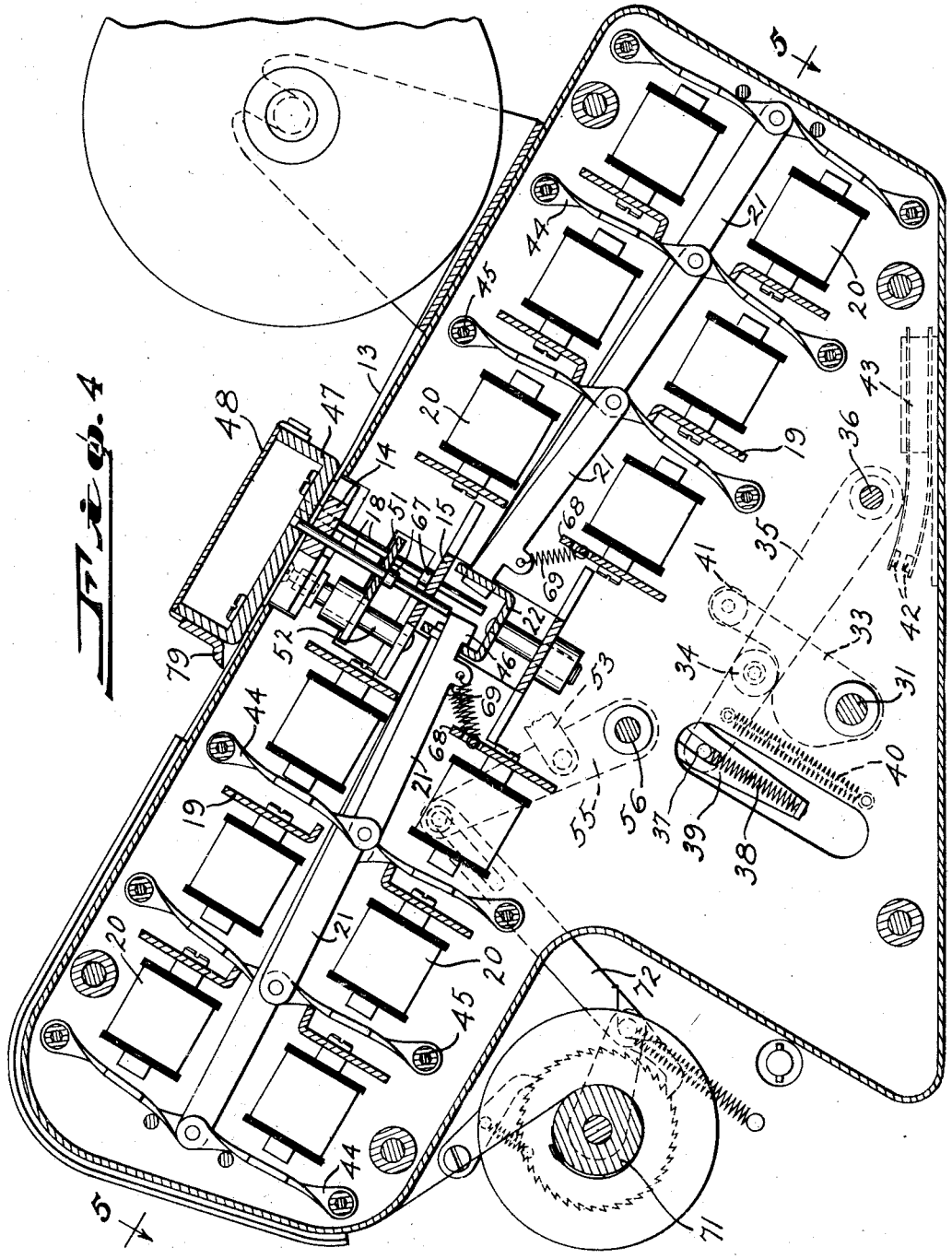

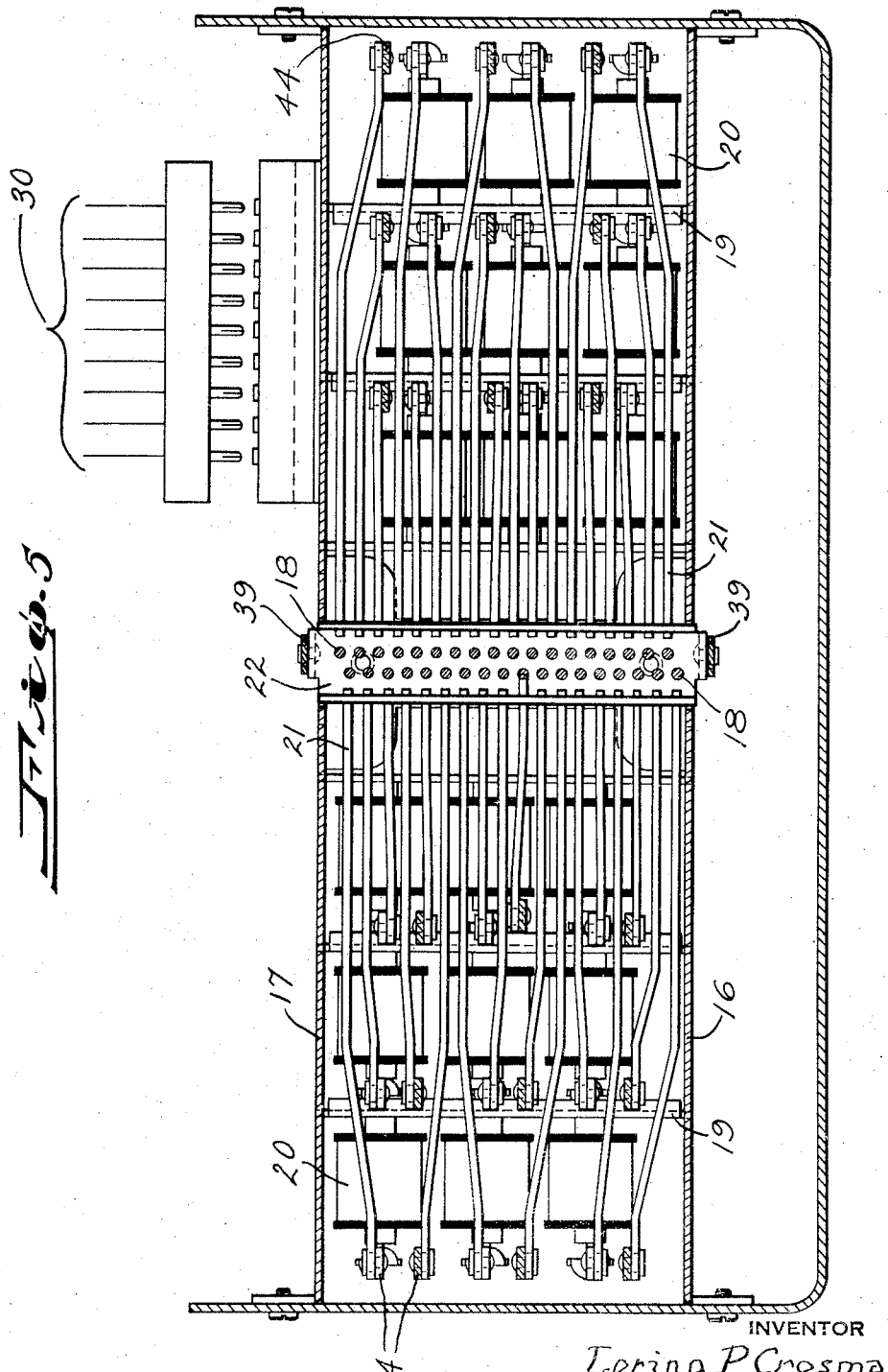

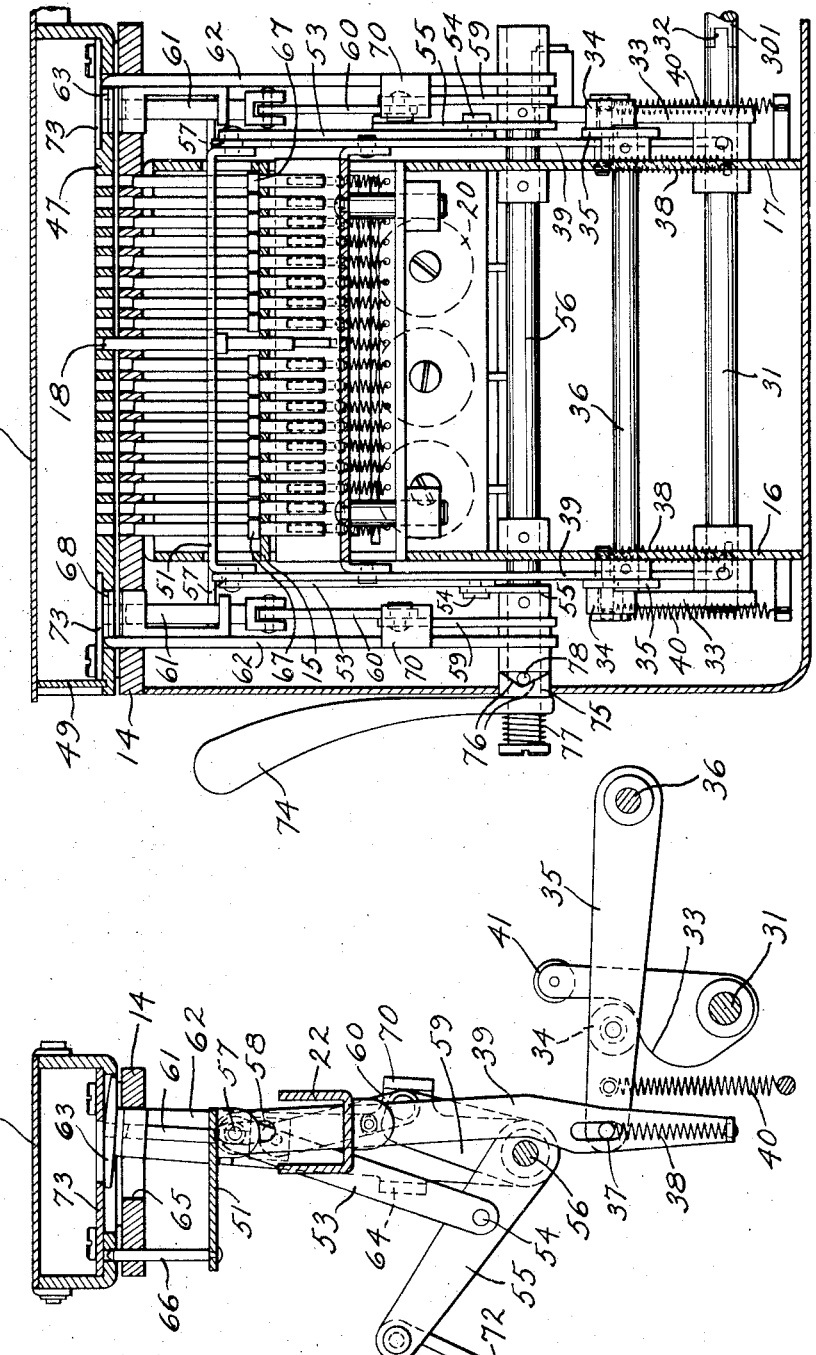

July 10, 1934.  L. P. CROSMAN  1,965,884
PROVING CALCULATING MACHINE
Filed April 13, 1933  15 Sheets-Sheet 7
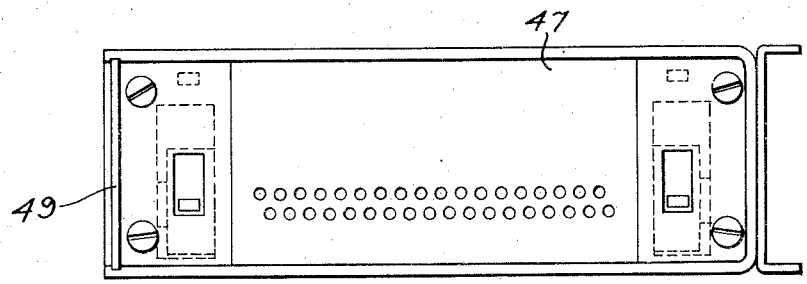
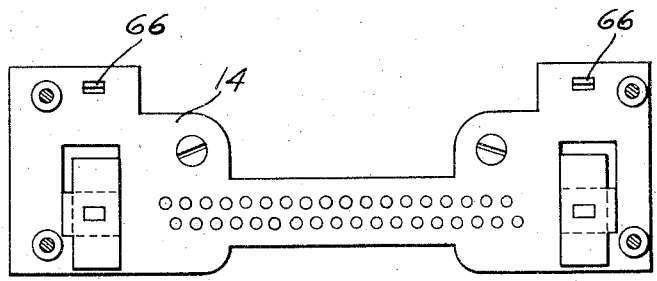
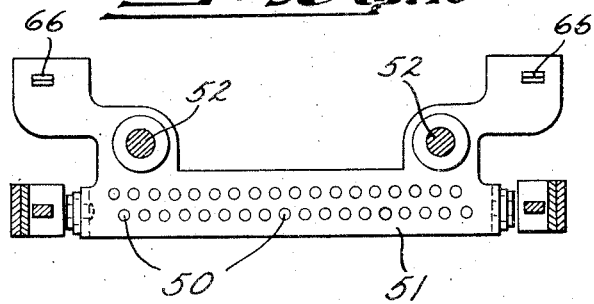
INVENTOR
Loring P. Crosman
BY
Stuart Wilder ATTORNEY

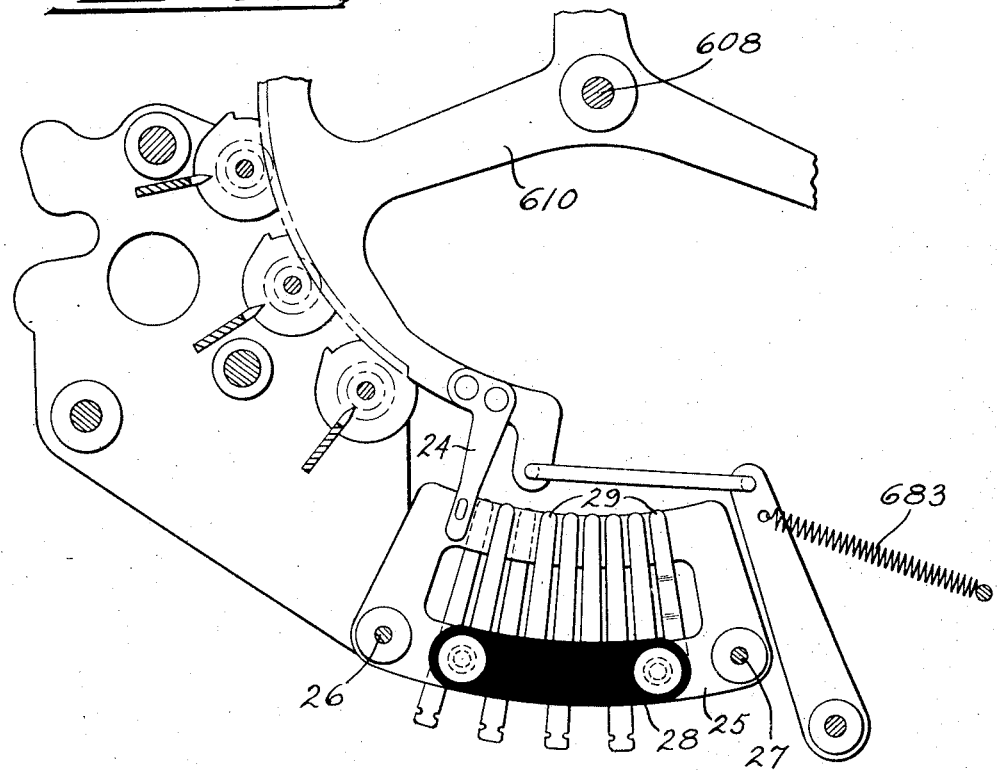
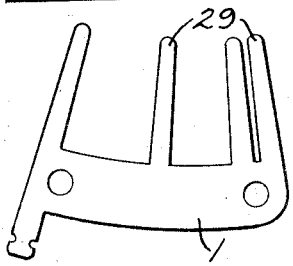
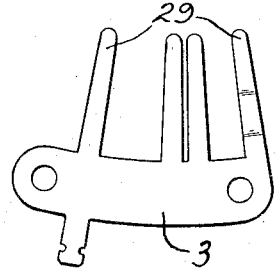
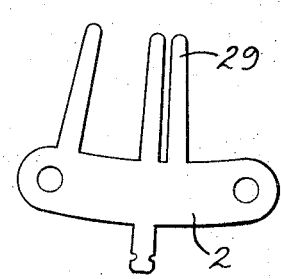
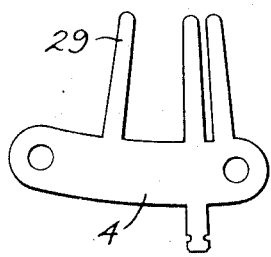

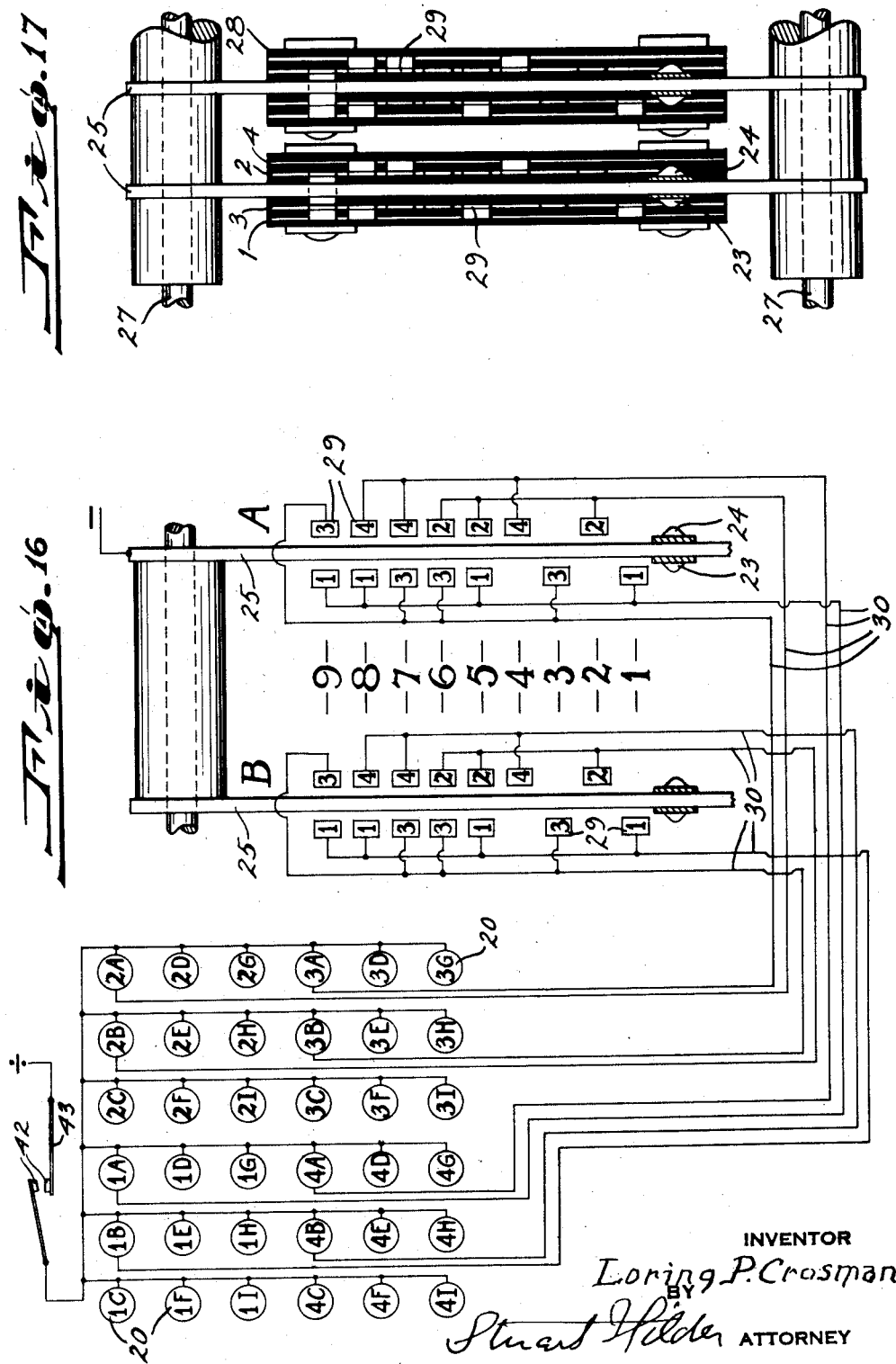

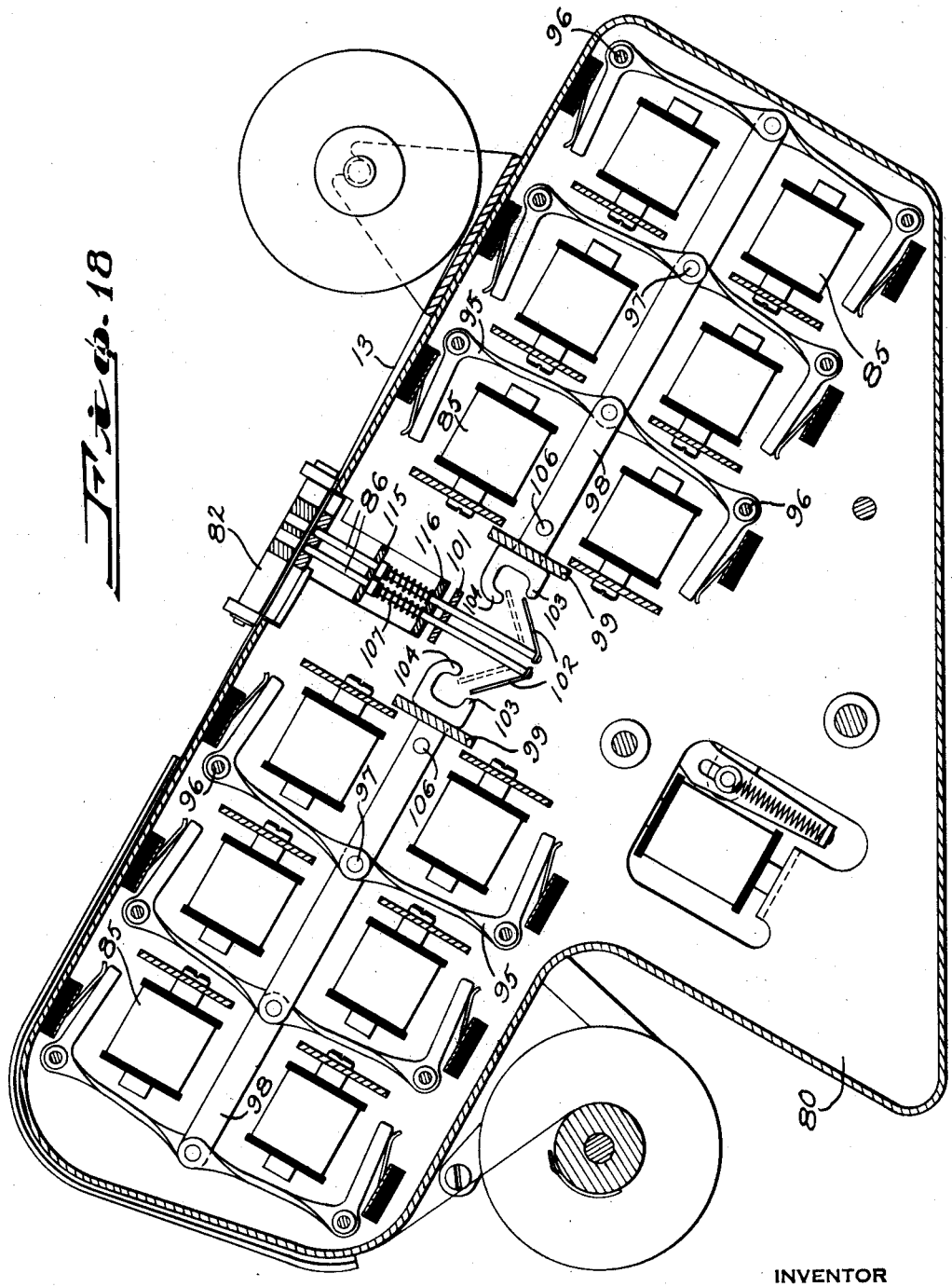

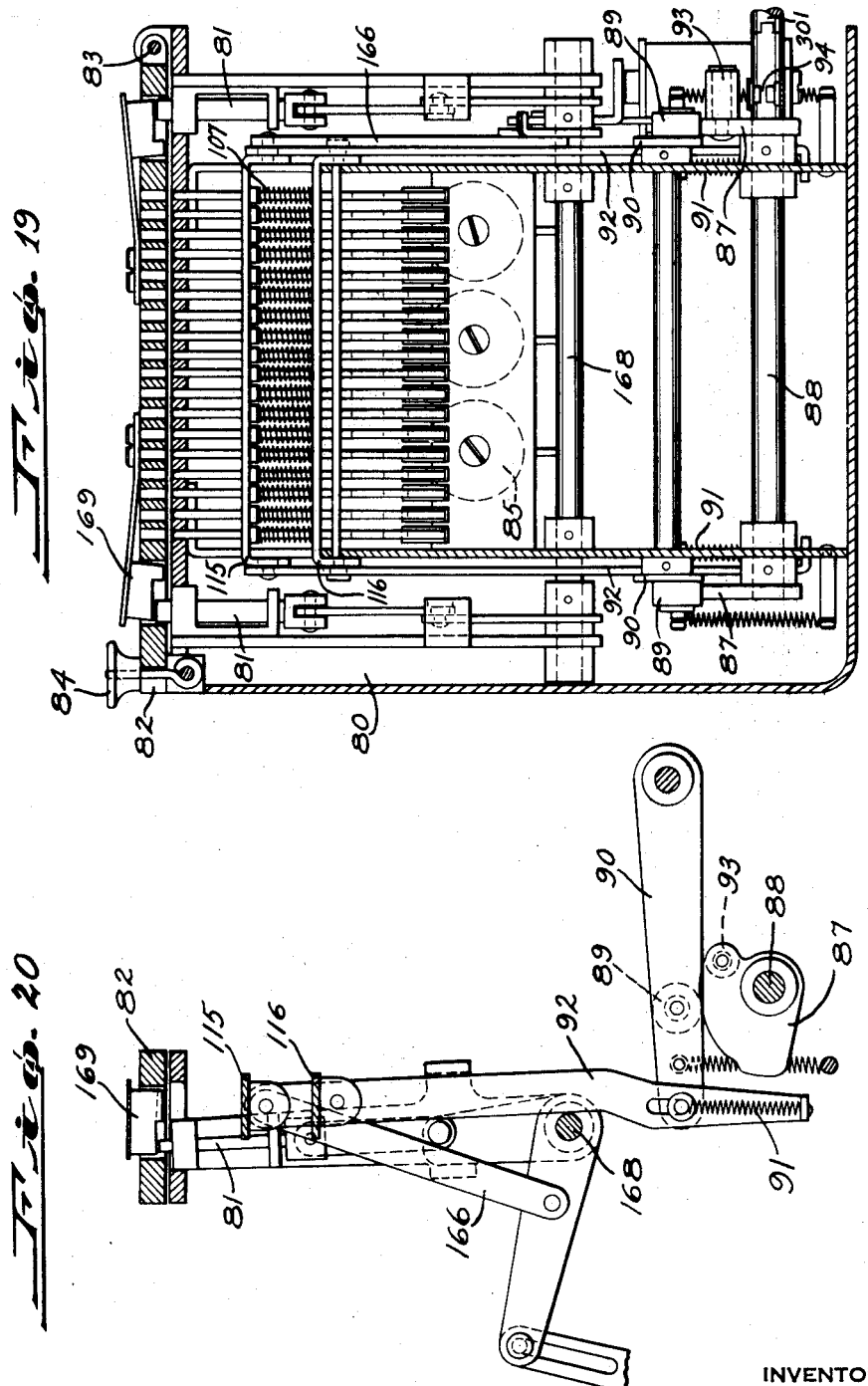

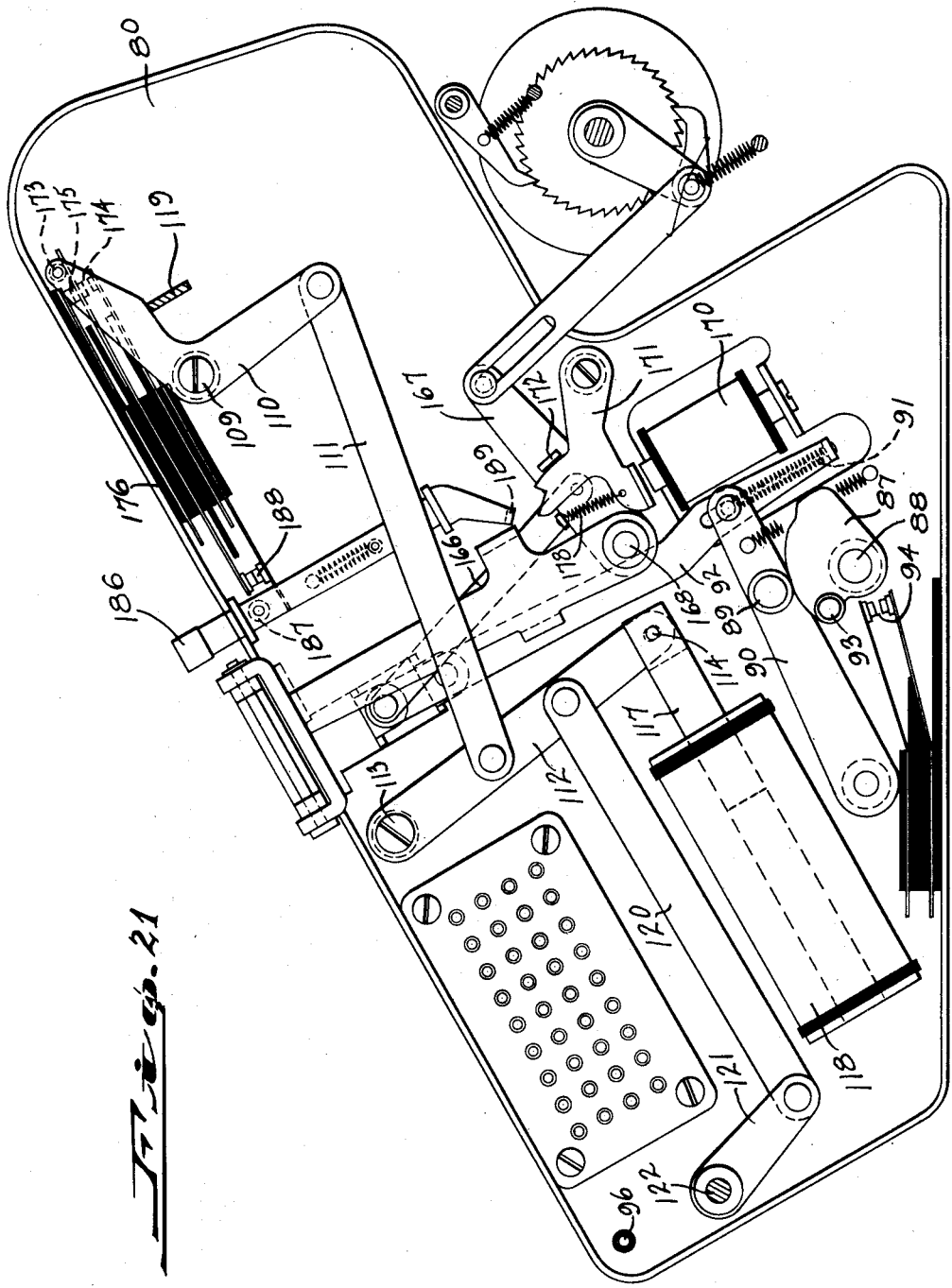

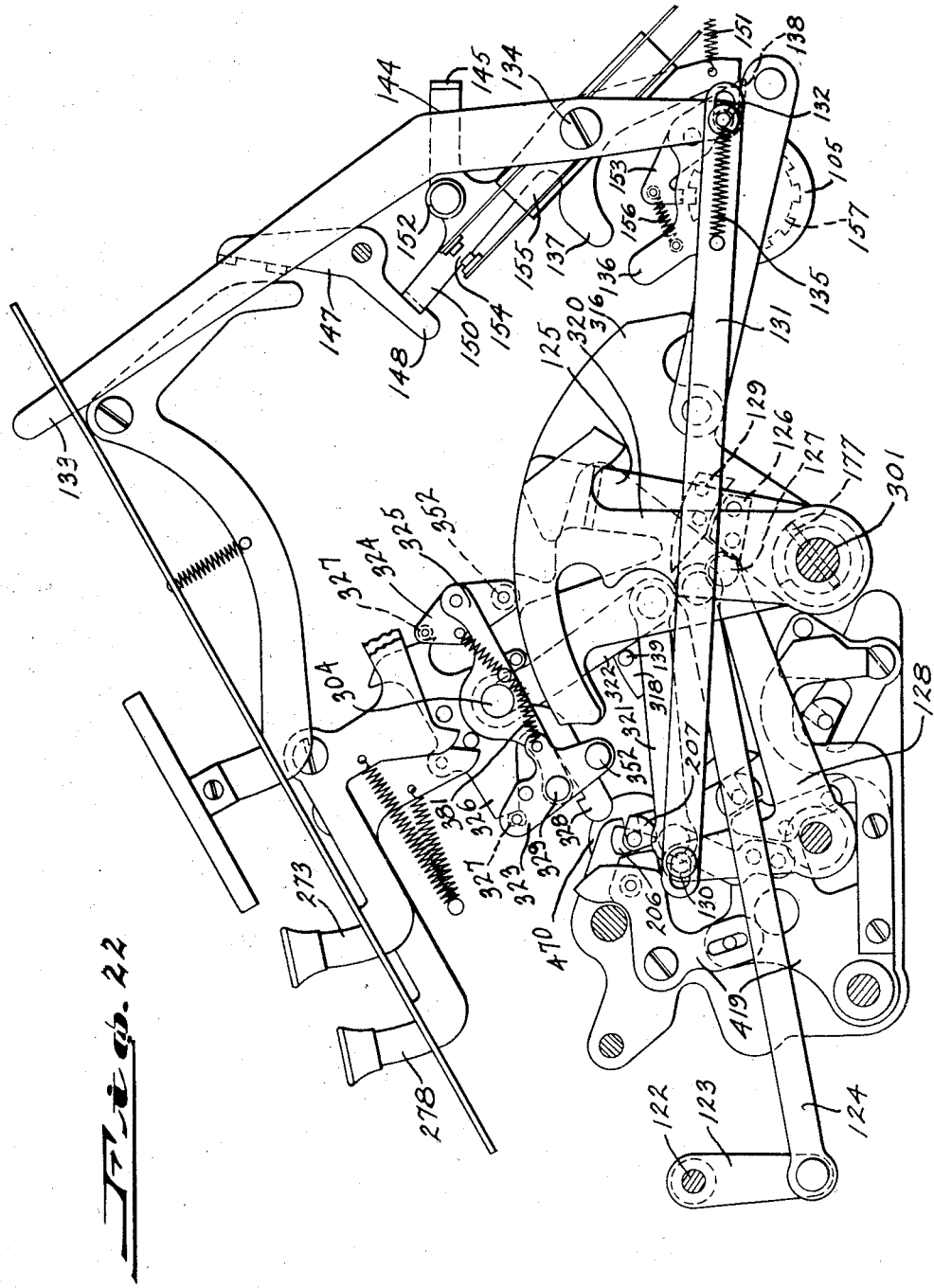

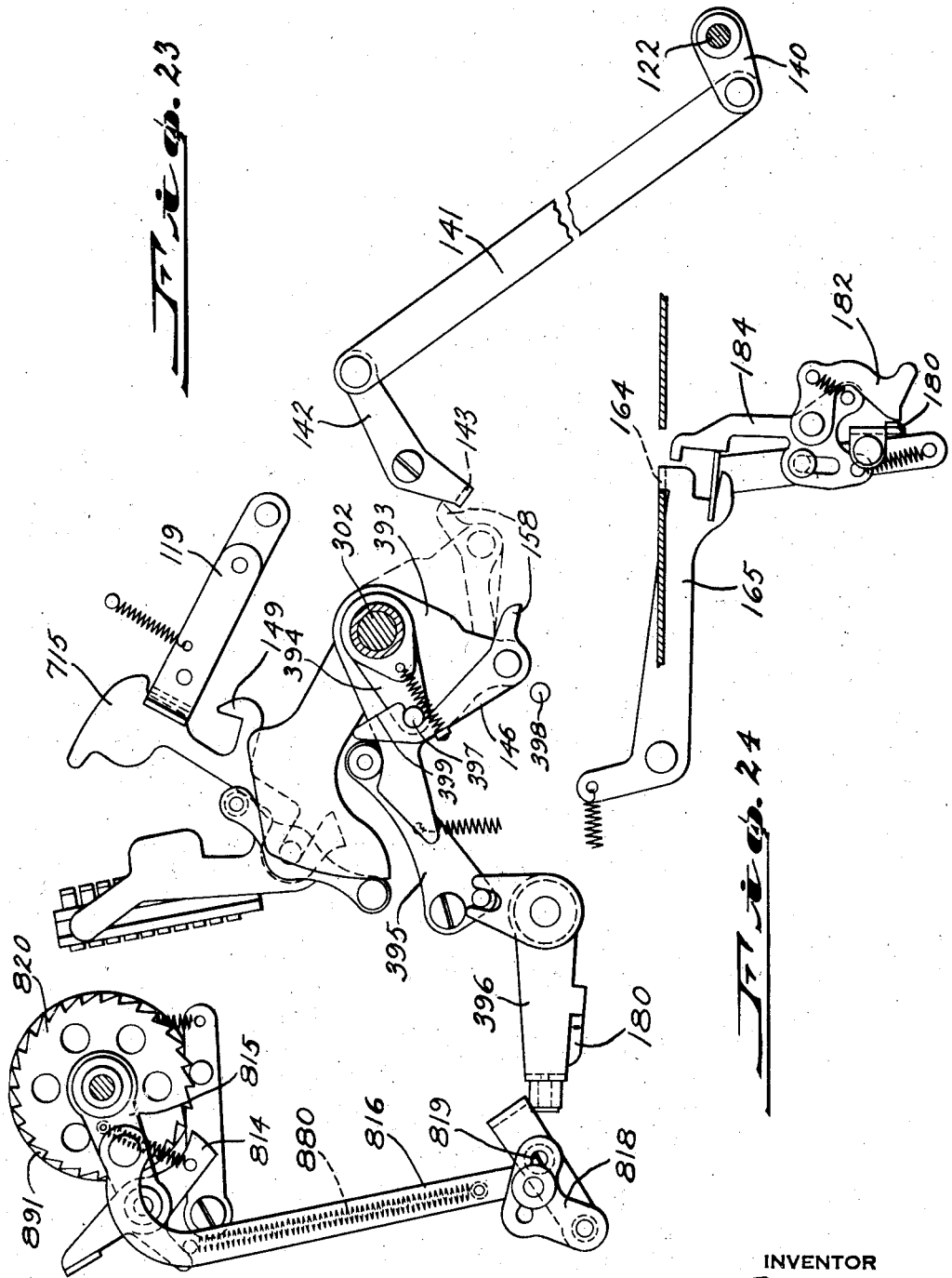

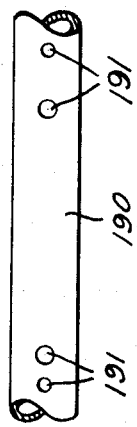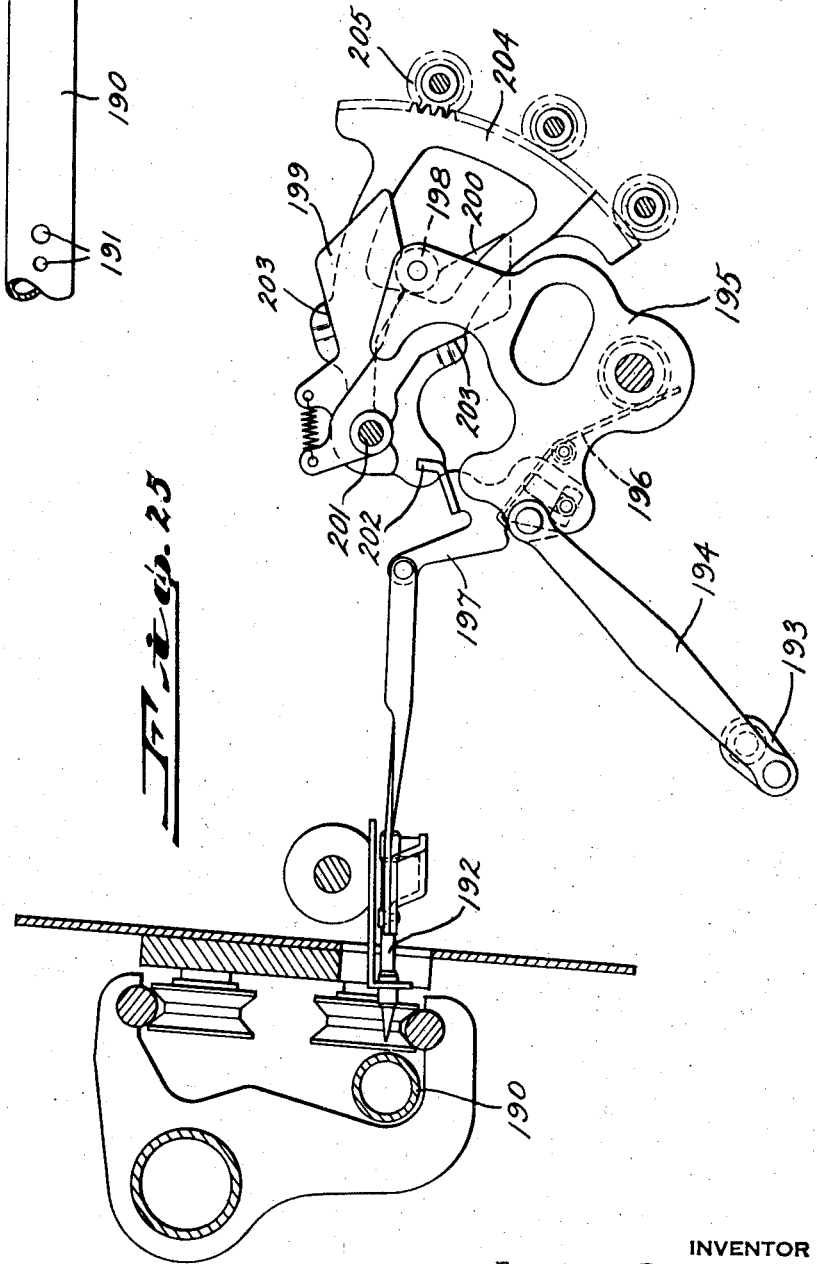

Patented July 10, 1934

1,965,884

UNITED STATES PATENT OFFICE 1,965,884

PROVING CALCULATING MACHINE

Loring Pickering Crosman, Maplewood, N. J., assignor to Gardner Company, Orange, N. J., a corporation of Delaware Application April 13, 1933, Serial No. 665,878

7 Claims. (Cl. 235—60)

The invention relates to means for checking the accuracy of records, statements, etc., prepared upon a listing calculating machine.

Taking bank statement work as an example it is customary to enter the debit and credit items of a given account, as shown by the deposit and withdrawal slips, upon a ledger sheet, these items being added to or subtracted from the old balance, to obtain a new balance whenever an entry is made. The entries are made one after another upon a series of ledger sheets, representing different accounts, and are accumulated upon debit and credit registers, from which totals are taken at the end of a run. Thereafter, the deposit and withdrawal slips are sent to a second operator, who makes the same entries upon a series of statement sheets, this work, if correctly performed by both operators, providing a duplicate record. The totals of the debits and credits obtained by the two operators is then compared, and if these do not agree the ledger and statement sheets must be checked over until the source of the discrepancy is located.

Such checking is laborious, and erasure and correction of the entries upon a statement sheet, to be sent to a depositor may be necessary. With the object of overcoming these objections, the present invention provides for an automatic comparison of the ledger and statement operations, giving unmistakeable notice of any discrepancy. Furthermore, the comparison is made during the preparation of the statements, and the work is stopped before any item is printed which does not agree with the corresponding ledger item.

The invention consists in the novel construction and combination of parts, as set forth in the appended claims.

By way of example, the invention has been shown as applied to listing calculators of the Gardner type, illustrated in U. S. Patent No. 1,867,002, issued on July 12, 1932, to Clyde Gardner, deceased; and in application Serial No. 518,061, filed February 25, 1931 and No. 607,982 filed April 28, 1932, by Loring P. Crosman.

In the accompanying drawings, two calculating machines are illustrated, to which index perforating and index check units are attached, both calculators and both index units being similar in many respects, so that certain figures of the drawing are common to the two devices.

In these drawings:

Fig. 1 is a plan view of a calculator and index unit.

Fig. 2 is a left side elevation of the same.

Fig. 3 is a cross section taken just inside the right hand frame of the calculator.

Fig. 4 is a cross sectional view taken substantially on line 4—4 of Fig. 1 through the index perforating unit.

Fig. 5 is a sectional view taken substantially on line 5—5 of Fig. 4.

Fig. 6 is a transverse sectional view taken substantially on line 6—6 of Fig. 1, through the index perforating unit.

Fig. 7 is a cross section taken just outside the right hand frame 17 of Fig. 6.

Figs. 8, 9 and 10 are detail views of parts shown in Figs. 6 and 7.

Fig. 11 is a fragmentary right side elevation showing circuit selecting means.

Figs. 12, 13, 14 and 15 are detail views of the circuit plates.

Fig. 16 is a circuit wiring diagram.

Fig. 17 is a plan view of the circuit selecting means.

Fig. 18 is a cross section, similar to Fig. 4, but taken through the index check unit.

Fig. 19 is a cross section, similar to Fig. 6, taken through the index check unit.

Fig. 20 is a cross section, similar to Fig. 7, through the index check unit.

Fig. 21 is a right side elevation of the index check unit.

Fig. 22 is a cross section taken just inside the right hand frame of the checking calculator.

Fig. 23 is a fragmentary left side elevation of the printing and line spacing mechanism of the checking calculator.

Fig. 24 is a rear detail elevation of carriage tabulating means.

Fig. 25 is a left side elevation of an automatic register control mechanism.

Fig. 26 is a fragmentary detail view of an accumulator controlling bar.

Preferably, the invention is carried out by means of an index comprising a tape, perforated differentially in accordance with the amounts registered upon the calculating machine employed in making the original or ledger entries. When the statements are to be posted, this record tape is transferred to a second calculating machine, which machine can then be operated only in accordance with the settings indicated by the differential perforations.

The calculator

For each denominational order, the calculator to which the invention is shown as applied is provided with a three-armed actuator lever 610

(Fig. 3), these levers being loosely mounted on a shaft 608. The forward arm of each lever 610 terminates in a segmental registering rack; the rearward arm has a lister type bar 611 pivoted thereto, and the upper arm has pivotal connection with a differential stop bar 615 cooperating with a bank of digit keys 215 to limit the movement of the lever 610.

The digit keys 215 which have been depressed to represent a value are latched in position with the bottoms of their stems lying in the path of movement of the related stop lugs of the bars 615, allowing such bars to advance a distance proportional to the value of the key, upon operation of the machine. Depression of a digit key will also remove a column latch 214 from the path of movement of its related bar 615, these latches preventing movement of a stop bar and lever 610 in any column in which no key is depressed.

A rock shaft 301 is provided with cam means 318 for governing the movement of a spring tensioned rocker frame 616, mounted on shaft 608, frame 616 carrying a series of dogs 617 normally engaged by studs 659 of the levers 610. As shaft 301 is rotated forwardly, frame 616 will be rocked, and any of the levers 610 which have been released by the depression of digit keys will be allowed to rotate, under the influence of their springs 683, until they are stopped by the lugs of bar 615 contacting with the stems of the keys. Upon rearward rotation of shaft 301, the dogs 617 will return the operated levers 610 to normal position. The desired accumulators are meshed with the actuator racks of levers 610 during movement of frame 616 in one direction so that the excursion of the levers 610 serves to register amounts set in the keyboard upon one or more accumulators and (at the end of the forward movement of frame 616) to set up a similar amount on the printing line of the type bars. At the end of said forward movement, also, printing hammers 715 are operated, to record the items set up.

Shaft 301 is oscillated by means of an electric motor 100, connected through suitable clutch means with a crank arm 105, which, by means of a connecting rod 108, imparts oscillatory motion to an arm 316, fast upon shaft 301.

The record sheet is held against a platen supported in a transversely shiftable carriage, so that accumulated values may be printed in any one of several columns, and the accumulating, printing and in certain cases the carriage shifting operations are performed by power means, under control of suitable motor keys.

The perforating unit

As shown in Figs. 1 and 2 a compact unit 11 is secured to the framing of the listing calculator upon which the original or ledger record is to be made.

Extending transversely of the unit and supported by guide plates 14 and 15 (Figs. 4, 5, 6 and 9), secured to the frames 16 and 17, are thirty-six punches 18. Said punches are arranged in nine groups of four each, there being a group for each denominational order provided in the calculator. Each group of punches is adapted, upon operation of the machine to perforate a paper tape 13 in patterns significant of the digit values from one to nine set up in the related column of the calculator.

Secured to brackets 19 of the frames 16 and 17 are thirty-six magnets 20, there being a magnet 20 related to each punch 18, adapted when energized to interpose a filler arm 21 between the corresponding punch and a ram 22.

Punch selecting means

Insulated from and secured upon the forward arm of each three armed actuating lever 610 is a pair of wipers 23, 24, Figs. 11, 16 and 17, having electrical contact with frames 25, supported upon rods 26 and 27 insulated from the framing of the machine.

Each of the frames 25 (one for each denominational order) carries between suitable insulating strips 28, four circuit plates 1, 2, 3 and 4 (Figs. 11–17). The plate 1 of each order is provided with flexible contact fingers 29 so spaced as to contact wiper 23 upon movement of the lever 610 determined by the keys 215 corresponding to the digit values of one, five, eight and nine. (As illustrated diagrammatically in Fig. 16). In like manner, plate 3 will be contacted by wiper 23 for values three, six and seven and by wiper 24 for digit nine (the contact finger corresponding to the digit nine being offset to the right hand side of frame 25). Plates 2 and 4 are adapted to be contacted by wiper 24 for the digit values two, five and six and four, seven and eight respectively, as illustrated.

Each of the plates 1–4 is connected through circuit lines 30 to a corresponding magnet 20, controlling a given punch 18. In Fig. 16, illustrating these circuit connections, the enclosed Figures 1, 2, 3, 4, relate to the four plates, and the letters A, B, C, etc., to the columns or denominational orders.

Assuming, for example, that a value 396 were set up on the keys 215, and the machine operated, the appropriate punches 18 could be selected as follows:

The rack 610 of the units column being limited in its forward movement (by the depressed keys 215) to six steps, the wiper 23 will be brought into contact with one of the fingers 29 of plate 3 and the wiper 24 will contact with one of the fingers 29 of the plate 2. Thus a circuit is extended from the negative power source through the frame 25, wipers 23 and 24, plates 2 and 3 and leads 30 to two magnets 20 related to two of the four punches 18 of the units group.

In like manner a circuit is extended by contact with the fingers 29 of plates 3 and 2 of the tens order to two magnets 20 related to the tens group of punches 18, these two punches representing the digit nine.

In the hundreds denominational order there is no contact finger opposite the wiper 24, hence only one magnet 20 representing the digit three, will be energized, the circuit being established from plate 3.

Thus, as illustrated in Fig. 16, for each denominational order, any one of four magnets may be selected to represent the digit values from one to four, and a combination of any two to represent the digit values from five to nine.

Punch operating means

Referring to Figs. 6 and 7, an oscillating shaft 31 mounted in the frames 16 and 17 of the perforating unit has driving connection 32 with the shaft 301. Keyed to the shaft 31 are cams 33 located one on each side of the unit, and having engagement with rollers 34 mounted upon levers 35, keyed to a common shaft 36. Cams 33 are normally in the position shown in Fig. 7, wherein the free ends of levers 35 are held in raised position.

The rearward ends of the levers 35 have flexible connection, by means of pin and slot engagement 37 and springs 38, with rods 39 secured to each end of the punch ram 22.

As shaft 301 is oscillated, in the manner previously described, shaft 31 will also be oscillated, whereupon the cams 33 will fall away from rollers 34, allowing levers 35, under influence of their springs 40, to be rocked downwardly. Downward movement of the levers 35, through pin and slot engagement 37 will draw the rods 39 downwardly, thus lowering the ram 22.

At about that point in the forward movement of shaft 31 corresponding to the limit of movement (or ninth step) of the rack arms 610, an insulated roller 41 is adapted to close the contacts 42 (Figs. 4 and 16) of a master circuit switch 43, thus energizing the selected punch magnets 20. The armatures 44 of magnets 20 are pivotally mounted upon shafts 45, secured in the side frames of the unit, and to these armatures are connected the arms 21, whose free ends are supported in suitable slots of the ram 22.

Energizing of the magnets 20 will cause them to attract their respective armatures 44, moving the attached arms 21 so that their forward ends will be positioned beneath the corresponding punches 18.

Upon the first portion of the return movement of shaft 31 roller 41 will release contacts 42 of switch 43, thereby breaking the circuit to the magnets 20. However, arms 21 will have been locked in their forward position by means of projections 46, engaging the walls of ram 22.

It is to be noted that during the downward movement of ram 22 the arms 21 are adapted to contact the surface 68 of brackets 19, thereby releasing the projections 46 from ram 22 and allowing levers 21 and armatures 44 to restore to normal position, under influence of their springs 69.

Return movement of cams 33 will rock the arms 35 upwardly, tensioning springs 38 and thereby moving the rods 39 and ram 22 upwardly. Upward movement of the ram 22 will lift the forward ends of the arms 21, causing those arms which are set in advanced position to contact and raise their respective punches 18. The tape 13, passing between the punches 18 and a suitable die block 47 (Figs. 4, 6 and 8) secured to the guide frame 14, will thus be pierced. The die block 47 also serves as a receptacle for the paper punchings, a hinged cover 48 and a removable end plate 49 being provided to facilitate emptying said receptacle.

Tape feed mechanism

Each of the punches 18 project upwardly through apertures 50 in a plate 51 (Figs. 4, 6, 7 and 10), slidably mounted upon guide pillars 52 secured in the plates 14 and 15.

The plate 51 is connected at its ends, by means of links 53, engaging studs 57 and 54, with a pair of levers 55, secured upon a common shaft 56 supported in frames 16 and 17. Rods 39 have slot engagement 58 with studs 57, and as said rods move downwardly, upon the forward movement of cams 33, links 53 will cause levers 55 to rock shaft 56 counter-clockwise, as viewed in Fig. 7.

Secured to shaft 56 are arms 59 having link connections 60 with paper feed punches 61, slidable in guide lugs of rock arms 62, loosely mounted upon shaft 56. During the first portion of the movement of shaft 56, arms 59 will cause links 60 to raise the feed punches 61 into die heads 63 (formed as integral parts of rock arms 62 and frictionallly held by a spring tempered plate 73, as shown) piercing the pape tape 13. Upon further movement of shaft 56 arms 59 will engage the lugs 64 of the rock arms 62, rotating said arms rearwardly (thus feeding the tape 13) until stopped by engagement of arms 62 with surface 65 of plate 14.

Meanwhile rods 39 will have moved plate 51 downwardly sufficiently to withdraw holding plungers 66 (secured to said plate) from the paper tape 13. Also plate 51, by engagement with collars 67 of the punches 18, will have retracted any of said punches left in raised position from a previous operation.

Upon the upward movement of a punch 18 the collar 67 thereof will contact with and raise the plate 51 to normal position thereby, through links 53 and levers 55, rocking shaft 56 clockwise. Arms 59 will thus first withdraw the punches 61 and upon engaging the lugs 70 will rock the arms 62 to their normal position, shown in Fig. 7. Also the plungers 66 will have been raised to normal position, securing the paper tape 13 by engagement with the perforations made by punches 61.

The tape 13 may either be fed into a suitable receptacle or may be wound upon a spool 71, operated by pawl and ratchet means, under the influence of a spring tensioned arm 72 having pin and slot engagement with the lever 55 as shown in Fig. 4.

Skip feed means for idle operation

During an idle stroke of the machine ram 22 will receive a downward and upward reciprocatory movement. Also rods 39 will have lowered the plate 51 causing the punches 62 to pierce and feed tape 13 as previously described.

However, no value having been indicated on the actuator levers 610, no magnet 20 will have become energized during an idle stroke. Therefore at the completion of the downward movement of ram 22 all filler arms 21 will remain in retracted position. No punch 18 will now be raised upon upward movement of ram 22 thus leaving the plate 51 in its lowered position. The feed mechanism previously described will thus be left in mid-operated position. Consequently, during the forward movement of the next operation of the machine no feed action will take place. Upon the return stroke of the next active operation, however, the ram 22 will engage the advanced filler arms 21 and raise plate 51 restoring the feed mechanism to normal position in the manner previously described.

Feeding the tape manually

Loosely mounted upon shaft 56 is a hand lever 74 having a hub 75 provided with cam surfaces 76, which are held by spring 77 in engagment with a pin 78, secured in shaft 56.

To advance the paper manually, an idle stroke of the machine is first initiated, this being necessary in order to withdraw any punches 18 from the tape 13 and to release the plate 51.

The hand lever 74 is then reciprocated, rocking shaft 56 and thus operating the feed mechanism.

The above-described operation is particularly useful after the work has been completed by the operator, it being then necessary to advance the tape 13 one or two steps to bring the perforations beyond the knife 79 secured to block 47.

Recording totals on the tape

In total taking, a shaft 607, Fig. 3 having a spirally arranged row of pins is adapted to successively trip latching dogs 617, from right to left of the machine. This tripping of dogs 617 releases suitable zeroizing hooks 613 which fall into the path of movement of zero stops 457 of the particular accumulator which may be in engagement with the actuating racks 610. The tripping movement of dogs 617 having also released the racks 610, said racks under influence of their springs 683, will be rotated until stopped by contact of the zero stops 457 with the zeroizing hooks 613.

The wipers 23 and 24 will thus be positioned opposite the contact fingers 29 of the plates 1 to 4 corresponding to the value accumulated upon the register.

A cycle of operation now being made, in order to print the total and return the actuator racks to normal position, in well known manner, circuits are established to the magnets 20 related to the punches 18 of corresponding value, said punches acting to perforate the index tape 13 upon completion of a cycle of operation, all as heretofore described.

The first operator having completed her work, the index tape 13, together with the withdrawal and deposit slips, is then sent to the second operator, to have the depositors' statement forms made up.

The index check unit

Secured to a second listing calculator is the index check unit 80 (Figs. 18–21), similar in many respects to the perforating unit 11 but adapted to prevent listing of items or totals upon the statement form which do not agree with the corresponding ledger entries.

The perforated tape 13 is inserted over the normally raised paper feed plungers 81, by lifting head 82 hinged at 83 and locked in position by means of thumb screw 84, as shown in Fig. 19. The tape 13 having been inserted and head 82 locked into position the operator is ready to perform listing calculations upon the calculator in the usual manner.

The index check unit 80 is provided with 36 magnets 85 (similar to the magnets 20), adapted to be selected according to the digit values set up on the keys of the calculator in the same manner as magnets 20 of the perforating unit 11. Extending transversely of the unit are thirty-six feeler plungers 86, corresponding to the thirty-six punches 18, and adapted to cooperate with magnets 85 to detect a discrepancy in the following manner.

Means for detecting an error

Assuming the tape 13 to be perforated according to the value 396, while the second operator, in error, has set up the value 395 upon the keyboard of the calculator.

Upon an operative cycle of the machine cams 87, secured to a shaft 88 having driving connection with the shaft 301, will receive reciprocatory movement. When the stop bars 615 (Fig. 3) have reached their limit of forward movement, cams 87, having engaged rollers 89, will have raised levers 90 and, through flexible spring connections 91, the rods 92 half the distance of their total upward movement.

As cams 87 continue their forward movement, an insulated roller 93 will contact the points 94 of a switch corresponding to the switch 43 shown in the diagram of Fig. 16. A circuit thus having been completed to the magnets 85 related to the digit values, three, nine and five of the hundreds, tens and units order, said magnets will become energized and attract their respective armatures 95.

Armatures 95 are pivotally supported upon shafts 96 insulated from the framing of the unit. Pivotally secured at 97 to the free ends of the armatures 95 are contact arms 98, slidably supported at their forward ends in apertures of plates 99, also insulated from the framing of the record check unit. Movement of contact arms 98, will be limited by contact of pins 106, secured thereto, with the plates 99.

The lower portion of the feeler plungers 86 are square in cross section and held against rotative movement by a guide plate 101. Secured to the lower portions of each of the feeler plungers 86 is a wiper 102, adapted to contact the projection 103 or 104 of a contact arm 98 only when the value set up on the keyboard does not coincide with the perforations of tape 13.

Feeler plungers 86 also extend through apertures in plates 115–116, secured to the rods 92 and adapted to control the movement of said plungers as follows:

During the half step upward movement of the rods 92, previously described, compression springs 107, interposed between the plates 115 and 116 will tend to carry the plungers 86 upward, bringing the wipers 102 of those plungers corresponding to the perforations in tape 13 to the position indicated by dotted lines in Fig. 18; while those plungers not corresponding to the perforations will engage said tape and be held in their lowered position.

Thus, in the illustrative problem, the plungers 86 related to the digit values three, nine and six will have been moved upwardly.

Magnets 85, then becoming energized, the contact arms 98 relating to the digit values three, nine and five are moved forwardly. In the hundreds and tens denominational order, the correct digit values, namely three and nine, having been set up, the projections 103 of the advanced contact arms 98 related to said values will not move forward sufficiently to contact the raised wipers 102 of the corresponding plungers 86. In the units denominational order, however, the following condition exists. Two plungers 86, according to the perforations made from circuits 3 and 2 (Fig. 16), for the digit value six, have moved upwardly, whereas two contact arms 98 according to the circuits 1 and 2, for the digit value five have moved forward. The position of the parts according to circuit 2 will of course be similar to that above-described for the digits three and nine, i. e., the plunger will be up and contact arm 98 forward, since the circuit number 2 is common to both the five and six digit circuits. But digit six has also provided that plunger corresponding to circuit 3 should rise whereas the digit five has provided for advancing the contact arm 98 related to circuit 1. There being no perforation in tape 13 corresponding to circuit 1, the related plunger 86 will be held in lowered position. The projection 103 of the advanced contact arm 98 for circuit 1 will therefore contact its wiper 102, and a circuit will thus be established from the grounded plungers 86, wiper 102, the advanced contact arm 98 across plate 99 to one of the arms 98, corresponding armature 95 and shaft 96 which is connected by suitable circuit lead to a solenoid 118 (Fig. 21). Solenoid 118 will thus become energized to perform the several functions hereinafter described.

As cams 87 continue their forward movement, those plungers 86 which are free to rise will move to the full limit of their movement. However, in those columns wherein the advanced contact arms 98 coincide with the perforations of tape 13, the upward movement of plungers 86 will not be sufficient to cause a contacting of wipers 102 with the projections 104 of arms 98. If, however, a second type of error has occurred, such for instance as omitting to depress a digit key, the related magnets 85 not being energized, arms 98 will remain in retracted position, whereupon wiper 102 will contact the projection 104, extending the ground circuit to solenoid 118 through the mediums above-described.

After the new setting has been compared with the index, as above-described, further forward movement of the calculator shaft 301 provides for releasing of hammers 715 (Figs. 3 and 23) for the usual printing operation.

*Means for preventing an erroneous printing operation*

Pivotally secured at 109 (Fig. 21) to the inner frame of the index check unit is a bell crank lever 110 having link connection 111 with an arm 112, pivoted to the framing at 113. The lower end of arm 112 has connection at 114 with the plunger 117 of solenoid 118.

Thus, energizing of solenoid 118 upon the occurrence of an error, will cause bell crank 110 to be rocked clockwise, as viewed in Fig. 21, depressing a bail 119 into engagement with hooks 149 (Fig. 23) of the hammers 715, latching said hammers to prevent a printing operation.

*Means for arresting an erroneous registering operation*

According to the known construction, depression of a machine operating key will rock a lever 147 (Fig. 22) to disengage hook end 148 from lever 150, allowing the latter, under influence of spring 151, to release clutch pawl 153 pivotally mounted upon the crank 105. Said pawl, thus freed will move under influence of its spring 156 into engagement with a notched disk 157 having suitable drive connections with the motor 100.

Simultaneously with the release of pawl 153 an insulated roller 152 mounted upon lever 150, will contact the points 154 of the motor switch 155 and initiate an operating cycle of the machine.

Energizing of solenoid 118, as the result of an erroneous value setting, and the consequent rocking of arm 112 will however prevent the completion of an operating cycle of the machine as follows:

Arm 112 (Fig. 21) has link connection 120 with an arm 121 secured to a shaft 122 extending transversely of the machine. Secured to the right hand end of shaft 122 is an arm 123 (Fig. 22) having link connection 124 with a rock arm 125, loosely mounted upon the common hub of the cam members 316 and 320, fast upon shaft 301. Energizing of solenoid 118, will therefore act to rock the arm 125 forwardly. Forward movement of rock-arm 125 causing a cam block 126, fixed thereupon, to engage with and raise a roller 127, mounted upon one end of a bell crank lever 128, into the path of return movement of a cam block 129, fast to the reciprocating cam member 316.

Bell crank lever 128 has pin and slot connection 130 with a link 131, the latter also having pin and slot connection 132 with a hand lever 133, pivotally mounted at 134. During the first part of the return movement of cam member 316, cam block 129 will engage roller 127 and rock bell crank lever 128 still further in a counter-clockwise direction; whereupon link 131, acting through spring 135 will rock the hand lever 133 clockwise about its pivot point 134.

Clockwise movement of lever 133 will cause the surface 144 thereof to engage projection 145 and rock lever 150 sufficiently to disengage contact points 154 of switch 155 thus breaking the electrical circuit and allowing the machine to come to rest. The above-described movement of lever 150 is not however sufficient to cause a relatching of hook 148.

The machine having come to rest before the completion of a cycle of operation, the usual keyboard locking devices will be in effect, thereby preventing further operations upon the keyboard at this time. This together with the rearward position of lever 133 serves to indicate that the value setting is not in accordance with the value on the index tape.

The operator now having been warned of the presence of an error, will immediately check the keyboard set up with the work slips. Assuming that the keyboard set up does not agree with the work slips, the operator will then bring the machine to full cycle position by manually moving lever 133 forward, causing reestablishment of the motor circuit by reengaging contacts 154.

Near the completion of the cycle of operation a projection 136 of crank arm 105, contacting an arm 132 of lever 150, will restore said lever to normal latched position, breaking the motor circuit. The lower portion of said lever being moved into the path of movement of projection 138 of pawl 153, will cause disengagement of said pawl from the notched disk 157.

Also a pin 177, secured in shaft 301, will act to restore rock arm 125, and the other parts related to solenoid 108 to normal position.

*Means for preventing or correcting an incorrect registration upon the accumulators*

The registers 470, during an operative cycle of the machine are adapted to be moved into and out of mesh with the rack arms 610 according to the sign character of the operation, by means of cam plates 419, having connections through link 321 and arm 322 with a rocker arm 325, pivotally supported upon shaft 304.

At the forward end of the rocker arm 325 is pivotally mounted a pawl 323 and on the rear of said arm is pivotally mounted a pawl 324, the two pawls being connected by a spring 381, which serves to hold them yieldably in normal additive position, with their pins 327 in engagement with control plate 326.

During the first part of the forward movement of an additive stroke cam 320 will engage the roller 352 of forward pawl 323 and rock arm 325 clockwise, to disengage the normally engaged registers 470 from the rack arms 610 before any movement of the racks takes place. Upon the first part of the return stroke, cam arm 316 will engage the roller 352 of rear pawl 324, imparting counter-clockwise movement to the arm 325, thereby reengaging the registers 470 with racks 610, said racks during their return movement acting to effect additive registrations upon said accumulators.

For a subtractive cycle of operation, the control plate 326 is rocked (by suitable means not shown) free of the pin 327 of forward pawl 326. A hook end 328 of said control plate, however, will now be in engagement with the forward surface of pin 327.

Upon forward movement cam arm 320 will now merely rock pawl 323 about its pivot point 329, allowing the registers 470 to remain in engagement with the racks 610 during their forward movement, providing for a subtractive operation upon said registers. During the first part of the return stroke cam arm 320, acting upon roller 352 of forward pawl 323, will rock arm 325 to disengage the registers 470 prior to the return movement of racks 610.

Near the completion of a cycle of operation a pin 139 of the cam 318 (Figs. 3 and 22) will engage arm 322 and restore the parts to normal position, reengaging the registers 470.

As previously described, if an error has occurred the solenoid 118, near the completion of a forward stroke, will rock the arm 125 forwardly. This will bring said arm beneath the rollers 352 of pawls 323 and 324, holding them out of active relation with the cams 316 and 320 during the return movement. Thus, in an additive operation, the registers 470 will remain out of engagement during the return movement of racks 610, to provide for non-registration. Also, in a subtractive operation, the registers will be left in engagement during the return stroke of racks 610, thus restoring to said registers the value erroneously subtracted.

The usual total key 278 is adapted to rock plate 326 and set the pawls 323 and 324 for subtractive operation, the register being rotated subtractively to zero; and, should a discrepancy exist in the total as registered upon an accumulator 470 and that indicated by the perforations in tape 13, the subtracted value will be added back into the register, as in an ordinary subtractive operation.

Depression of key 273, for a sub-total operation, while sufficient to rock plate 326 free of the pin 327 of pawl 323, will not however rock hook 328 far enough to engage the pin 327. Thus, the forward pawl 323 will be free to pivot idly about point 329 and the roller 352 of rear pawl 324, remaining above the path of movement of cam arm 316, the register 470 will remain in normal engaged position with racks 610 for the full cycle of operation, whether the amount registered is correct or incorrect, so that the registration will be restored in any case.

*Means for preventing—line spacing or—tabulating during an erroneous operation*

At the end of each registering or totaling operation the record paper or statement sheet platen 891 (Fig. 23) will be rotated by a line space mechanism operated from a shaft 302, oscillated by means of a link connection 162 (Fig. 3) between the cam arm 316 and an arm 163 of shaft 302. The forward excursion of cam arm 316, oscillating shaft 302, will move arm 394, plate 393, levers 395, 396 and 818 (fulcrumed at 819), link 816, and arm 815, allowing pawl 814 to rise, through the action of spring 880, and engage with platen ratchet 820. During return movement of shaft 302 a pin 397 secured to arm 394 and normally in engagement with the hooked end of pawl 146, pivotally mounted upon plate 393, will act to restore said plate and the parts 395, 396, 818 and 816 to normal position, advancing the platen and disengaging pawl 814.

Under a different setting of controlling parts (not shown) this movement of shaft 302, instead of line spacing the platen, will effect shifting of the platen carriage into another column. For this purpose a projection 180 of lever 396 is adapted, by engagement with a latch pawl 182 (Fig. 24), to raise the trigger 184 into engagement with the projection 164 of the carriage positioning lever 165.

During an erroneous operation, however, shaft 122, having been rocked (counter-clockwise as viewed in Fig. 23) by energizing of solenoid 118, an arm 140, secured to said shaft and having link connection 141 with a bell crank lever 142, will rock said bell crank to cause its projection 143 to engage end 158 of pawl 146 (plate 393 having carried pawl 146, during the forward stroke of the machine, to the position shown in dotted lines) rocking the hooked end of said pawl out of the path of return movement of pin 397, thus preventing either a line spacing or a tabulating operation.

During the forward movement of a following operation pin 397 by engagement with surface 399 will rock pawl 146 downwardly and reengage with the hooked end of said pawl. During the above-described movement plate 393 is held against counterclockwise rotation by means of stop pin 398.

*Tape feed devices*

Feed devices (Figs. 19, 20 and 21) are also provided adapted to advance the index tape 13 during each normal operation of the machine, as follows:

The right hand rod 92 has link connection 166 with an arm 167, secured upon the shaft 168. The previously described upward and return movement of rods 92 will therefore impart a reciprocating movement to shaft 168 to operate plungers 81 of feed devices similar to those employed for the perforating unit.

The plungers 81, when moved to their lower position, will release spring tempered members 169, adapted for holding the index tape 13 during the return movement of said plungers.

*Means for disabling the tape feed devices during an idle stroke of the machine*

Connected in parallel circuit and adapted to be energized simultaneously with any of the magnets 85 is a magnet 170.

During an active stroke of the machine, magnet 170 becoming energized, will attract its armature 171 and rock said armature out of the path of movement of projection 172 of arm 167.

During an idle stroke of the machine, however, no values having been set up, no circuit will be made to magnets 85 or 170 whereupon (at the completion of a forward stroke of the machine) armature 171, under influence of its spring 178, will be moved into engagement with projection 172, thus preventing a feed stroke of plungers 81.

*Means for preventing tape feed during an erroneous operation*

As previously described, energizing of solenoid 118, upon the occurrence of an error, will rock bell crank lever 110 clockwise (Fig. 21).

Clockwise movement of bell crank 110 will cause an insulated pin 173 first to engage the contacts 174 and then to disengage the normally engaged contacts 175 of a switch 176.

Engagement of points 174 is for the purpose of preventing interruption at this time of the circuit to the magnets 85, while disengagement of points 175 will cause a breaking of the circuit to the magnet 170, thus allowing the armature 171 of said magnet to latch arm 167, to prevent an active stroke of the feed mechanism.

*Means for providing independent operation of the calculator and an index feed*

The above-related operations have all been based on the assumption that a discrepancy exists between the value set up on the calculator and the work slips, that is to say, the second operator has erred in setting up the amount on the keyboard or in registering an item.

Let us assume now that (the machine having failed to register) the operator finds that the keyboard set up agrees with the value on the work slip. It will then be evident that the first operator has made an error.

The error having been corrected upon the ledger sheet, the second operator will proceed as follows:

Having brought the machine to full cycle position and reset the correct amount upon the keyboard, she will hold depressed a key 186 during an operative stroke of the machine.

Depression of a key 186 will cause an insulated pin 187 to break the master circuit to the index check unit, by disengaging contacts 188 of switch 176. Also a projection 189 of the depressed key 186 will lie in the path of movement of armature 171, to prevent latching of lever 167. Thus, during this independent operation the calculator will perform its normal functions; also the index tape 13 will be advanced to the next position.

*Different operations verified*

It has been mentioned that an erroneous total will be discovered by the mechanism of the invention, independently of the discovery of an incorrectly set up item, and it may here be observed that such checking of the totals will show whether all the items have been correctly registered as positive or as negative amounts. It may also be observed that this verification will be obtained while the individual statement sheet is in the machine, since a new balance is printed upon each sheet before its removal.

In calculating machines of the type illustrated, it is possible to obtain an indication of the values both of items and of totals from the position of a single set of machine elements (the actuator segment 610) only by determining such position in mid-cycle, since there is no setting on the keyboard in total taking and since the segments do not correspond to an item setting until the frame 616 has moved forward.

A further checking will be obtained when the calculating machines employed are of the type wherein an accumulator is automatically conditioned for positive or for negative operation upon movement of the platen carriage into a given columnar position. In such case, the taking of the balance will determine not only that the items have been entered under the correct sign character, but also that they have been printed in the correct columns.

A mechanism of this type is illustrated in Figs. 25 and 26, wherein a tubular bar 190, mounted in the platen carriage, is provided with a line of orifices 191 of graded diameter, these orifices being brought successively, by transverse movements of the carriage, opposite a plunger 192. The plunger 192, mounted in the stationary frame of the machine, is urged toward bar 190, preliminarily to a registering operation, by a motor driven crank 193, link 194, rock arm 195, spring 196 and lever 197, said lever thereupon assuming one of three positions, according to whether the plunger encounters an unbroken surface of bar 190, or whether it enters to a greater or lesser extent into a large or a small orifice 191, respectively.

This movement of the crank 193 will also carry a roller 198 free of two cams 199, 200, pivoted upon a stationary support 201, and will bring a positioning tooth 202 of lever 197 into contact with said cams, to hold them, one or both, with their points above or below the path of movement of roller 198, according to the degree of movement permitted to plunger 192 and lever 197.

Cams 199 and 200 lie between lugs 203 of a toothed segment 204, meshing with a pinion 205 which controls the angular position of the supporting shaft of the accumulator wheels 470. As seen in Fig. 22, this supporting shaft is provided with two cams, 206 and 207, lying respectively opposite two laterally and circumferentially offset portions of cam plate 419. In the position illustrated, cams 206 and 207 are both inactive, but ninety degrees counter-clockwise movement of the shaft would bring the adding cam 206 into cooperative position with the lower surface of plate 419, while two hundred and seventy degrees counter-clockwise movement of the shaft would bring the subtracting cam 207 into position to cooperate with the upper surface of said plate. It will be obvious that the circumferential offsetting will bring the two portions of plate 419 into active position upon opposite movements of rocker 325.

The illustrated position of cams 199 and 200 is the additive position, determined by a small orifice 191, whereas, if cam 200 were positioned above roller 198, due to registry of plunger 192 with a large orifice 191 (plunger 192 and lever 197 moving oppositely, due to the interposition of a whiffletree device, not shown in detail), the subtraction cam 207 would be brought to active position, by the action of roller 198 on cam 200. If cam 199 were positioned below roller 198, due to the non-registry of plunger 192 with an orifice 191, said roller would act to render both cams 206, 207 inactive, and register 470 would not accumulate.

One or more of the accumulators may be equipped with plungers 192, etc., said plungers, in the latter case, cooperating with groups of orifices 191, indicated in Fig. 26.

Although in the above description the perforating unit and the index check unit have been described as attached to separate calculators it is evident that by the simple addition of a change lever for operatively connecting the one or the other unit, they might be operated from the same calculator.

I claim:

1. In apparatus for checking a series of values entered upon an index device, a listing calculator including an accumulator and differentially set, cyclically operable item and accumulated total value recording mechanism, means operable during successive recording cycles of the calculator to compare item and total values set up in the recording mechanism with values entered upon said device, and means, operable by the comparing means when the value set on the recording mechanism does not agree with a value entered upon said device, for stopping the calculator.

2. In apparatus for checking a series of values entered upon an index device, a listing calculator including an accumulator and differentially set, cyclically operable item and accumulated total value recording mechanism including printing hammers, means operable during successive recording cycles of the calculator to compare item and total values set up in the recording mechanism with values entered upon said device, and means operable by the comparing means when the value set on the recording mechanism does not agree with a value entered upon said device for disabling the printing hammers.

3. In apparatus for checking a series of values entered upon an index device, a listing calculator including an accumulator and differentially set, cyclically operable item and accumulated total value recording mechanism, including printing hammers and settable add-subtract and non-register determining devices, means operable during successive recording cycles of the calculator to compare item and total values set up in the recording mechanism with values entered upon said device, and means operable by the comparing means when the value set on the recording mechanism does not agree with a value entered upon said device to disable the printing hammers, and reset the determining devices to provide for elimination of the non-conforming value from the accumulator.

4. In apparatus for checking a series of values entered upon an index device, a motor driven listing calculator including an accumulator and differentially set cyclically operable item and accumulated total value recording mechanism including a plurality of motor operation keys and a motor control device common to said keys, means operable during successive recording cycles of the calculator to compare item and total values set up in the recording mechanism with values entered upon the index device, and means operable by the comparing means when the value set on the recording mechanism does not agree with a value entered upon the index device for disabling the motor control device.

5. In apparatus for checking a series of values entered upon an index device, a listing calculator including an accumulator and differentially set cyclically operable item and accumulated total value recording mechanism including settable keys and automatic key board clearing means, means operable during successive recording cycles of the calculator to compare item and total values set up in the recording mechanism with values entered upon said device, and means including an element movable into the path of the cyclically operable mechanism and operable by the comparing means when the value set on the recording mechanism does not agree with a value entered upon said device to stop said mechanism and thereby prevent operation of the keyboard clearing means.

6. In apparatus for checking a series of values entered upon an index device, a listing calculator including an accumulator and differentially set cyclically operable item and accumulated total value recording mechanism including tabulating means, means operable during successive recording cycles of the calculator to compare item and total values set up in the recording mechanism with values entered upon said device, and means operable by the comparing means when the value set on the recording mechanism does not agree with a value entered upon said device for disabling the tabulating means.

7. In apparatus for checking a series of values entered upon an index device, a listing calculator including an accumulator and differentially set cyclically operable item and accumulated total value recording mechanism including line spacing means, means operable during successive recording cycles of the calculator to compare item and total values set up in the recording mechanism with values entered upon said device, and means operable by the comparing means when the value set on the recording mechanism does not agree with a value entered upon said device for disabling the line spacing means.

LORING PICKERING CROSMAN.